(12) United States Patent
Tseng et al.

(10) Patent No.: US 11,893,372 B1
(45) Date of Patent: Feb. 6, 2024

(54) DEPLOYMENT SYSTEM FOR INTERNET OF THINGS AND DEPLOYMENT METHOD FOR THE SAME

(71) Applicant: NEXCOM INTERNATIONAL CO., LTD., New Taipei (TW)

(72) Inventors: Chien-Wei Tseng, New Taipei (TW); Po-Hsu Chen, New Taipei (TW)

(73) Assignee: NEXCOM INTERNATIONAL CO., LTD., New Taipei (TW)

( * ) Notice: Subject to any disclaimer, the term of this patent is extended or adjusted under 35 U.S.C. 154(b) by 63 days.

(21) Appl. No.: 17/885,145

(22) Filed: Aug. 10, 2022

(51) Int. Cl.
    *G06F 8/60* (2018.01)
    *G06F 11/20* (2006.01)

(52) U.S. Cl.
    CPC .............. *G06F 8/60* (2013.01); *G06F 11/201* (2013.01)

(58) Field of Classification Search
    CPC ................................ G06F 8/60; G06F 11/201
    See application file for complete search history.

(56) References Cited

U.S. PATENT DOCUMENTS

| 2017/0237779 | A1* | 8/2017 | Seetharaman | H04L 63/30 726/30 |
| 2019/0097835 | A1* | 3/2019 | Bhat | G06F 21/41 |
| 2019/0098635 | A1* | 3/2019 | Sarwar | H04W 72/541 |
| 2020/0177545 | A1* | 6/2020 | Shih | H04L 63/029 |
| 2021/0149740 | A1* | 5/2021 | Jia | H04L 67/10 |
| 2023/0141746 | A1* | 5/2023 | Jia | H04L 67/1012 718/104 |

\* cited by examiner

*Primary Examiner* — Zahid Choudhury
(74) *Attorney, Agent, or Firm* — Chun-Ming Shih; HDLS IPR SERVICES

(57) ABSTRACT

A deployment system for IoT including an edge server, multiple gateways, and multiple agent modules is disclosed. Each gateway is respectively connected with different peripheral devices to support different function. The edge server includes a flow editor used to edit a flow for a target gateway. The edge server performs a deploying procedure to the target gateway in accordance with the flow, wherein the deploying procedure is to first read a script and a parameter of one or more function nodes included in the flow, then encapsulate the script and the parameter into a packet, and then transmit the packet to the target gateway through one of the agent modules. The target gateway receives the packet through one of the agent modules and sequentially executes the function nodes according to the content of the flow, so as to implement a corresponding IoT function.

18 Claims, 7 Drawing Sheets

DEPLOYMENT SYSTEM FOR INTERNET OF THINGS AND DEPLOYMENT METHOD FOR THE SAME

BACKGROUND OF THE DISCLOSURE

1. Technical Field

The technical field relates to Internet of Things (IoT), and specifically relates to a deployment system and a deployment method used for deploying an IoT environment.

2. Description of Related Art

Internet of Tings (IoT) is a technique that allows multiple devices to directly connect and associate with each other through the Internet without human interference.

To effectively implement the IoT environment, some manufacturers provide gateways for the users to connect multiple devices in the environment. This kind of gateways may execute an IoT tool program. The IoT tool program is executed to integrate the communication protocols, the application program interfaces (API), and the online services, etc., of all of the devices connected with the gateways.

The IoT tool program includes a script of all the function nodes, such as a modbus node, a computation node, a transmission node, a receiving node, and an HTTP node, etc., that are possibly required for implementing an IoT function. Because there is no way to predict how the gateways may be used after configuration, a user needs to pre-install the entire IoT tool program to every gateway. In other words, all the gateways need to be installed with the script of all of the function nodes. However, a part of the gateways may be used to run only few of the function nodes; therefore, the hardware resources of the gateways are wasted.

When applying the IoT technique in an industrial environment, a huge factory may be arranged with multiple gateways. Every time when the IoT function needs to be updated, the user of the factory has to update each of the gateways in the factory one by one, which costs a huge time.

Besides, each of the gateways may be connected with difference devices to implement different IoT function, and the data being produced by each gateway is different. When the data of these devices is inquired, the user has to set, on a remote device, the IP address assigned to each of the gateways, so as to respectively connect the remote device to each of the gateways to inquiry the data. The related art does not provide a unified interface for data collection and data displaying, so it is troublesome for the user to monitor the data of the devices that are respectively connected to the gateways.

SUMMARY OF THE DISCLOSURE

The disclosure is directed to a deployment system and a deployment method for Internet of Things, which may complete a deploying procedure to all gateways in the environment by operating a single edge server.

In one of the exemplary embodiments, the deployment system for Internet of Things of the present disclosure may include:

an edge server, having a database and a plurality of first agent modules, wherein the database records a script and a parameter of multiple function nodes;

multiple gateways, respectively connecting with different peripheral devices to support different function, each of the multiple gateways being configured with a second agent module, wherein the edge server respectively connects to the second agent module of each gateway through the plurality of first agent modules; and a flow editor, arranged on the edge server, used to edit a flow of a target gateway of the multiple gateways, wherein the flow is consisted by multiple function nodes having a relationship with each other;

wherein, the edge server is configured to perform a deploying procedure to the target gateway, the deploying procedure obtains the script and the parameter of the multiple function nodes included in the flow from the database to generate a corresponding packet and transmit the corresponding packet to the target gateway through one of the plurality of first agent module, and the target gateway sequentially executes the script of each of the function nodes based on the flow to generate an execution result and transmits the execution result to the edge server through the second agent module.

In one of the exemplary embodiments, the deployment method for Internet of Things of the present disclosure may be incorporated with a deployment system comprising an edge server and multiple gateways, and including the following steps:

logging to the edge server, wherein the edge server comprises a database and a plurality of first agent modules, and the database records a script and a parameter of multiple function nodes;

opening a flow editor on the edge server;

selecting a target gateway from the multiple gateways on the flow editor, wherein each of the multiple gateways respectively connects to different peripheral devices to support different function, and each of the multiple gateways respectively comprises a second agent module;

editing a flow of the target gateway, wherein the flow is consisted by multiple function nodes having relationship with each other;

performing a deploying procedure to the target gateway based on the flow by the edge server, and the deploying procedure comprises:

reading the database to obtain the script and the parameter of the multiple function nodes in the flow to generate a corresponding packet; and transmitting the corresponding packet to the target gateway through one of the first agent modules;

sequentially executing the script of each of the function nodes based on the flow by the target gateway and generating an execution result; and transmitting the execution result to the edge server by the second agent module of the target gateway.

The present disclosure may use a single edge server to process the flow of all gateways in the environment and to perform the deploying procedure to all gateways. In comparison with the related art, the present disclosure may achieve the technical effect of saving hardware resources and time costs.

DETAILED DESCRIPTION

In cooperation with the attached drawings, the technical contents and detailed description of the present invention are described thereinafter according to multiple embodiments, being not used to limit its executing scope. Any equivalent variation and modification made according to appended claims is all covered by the claims claimed by the present invention.

Figure 1:
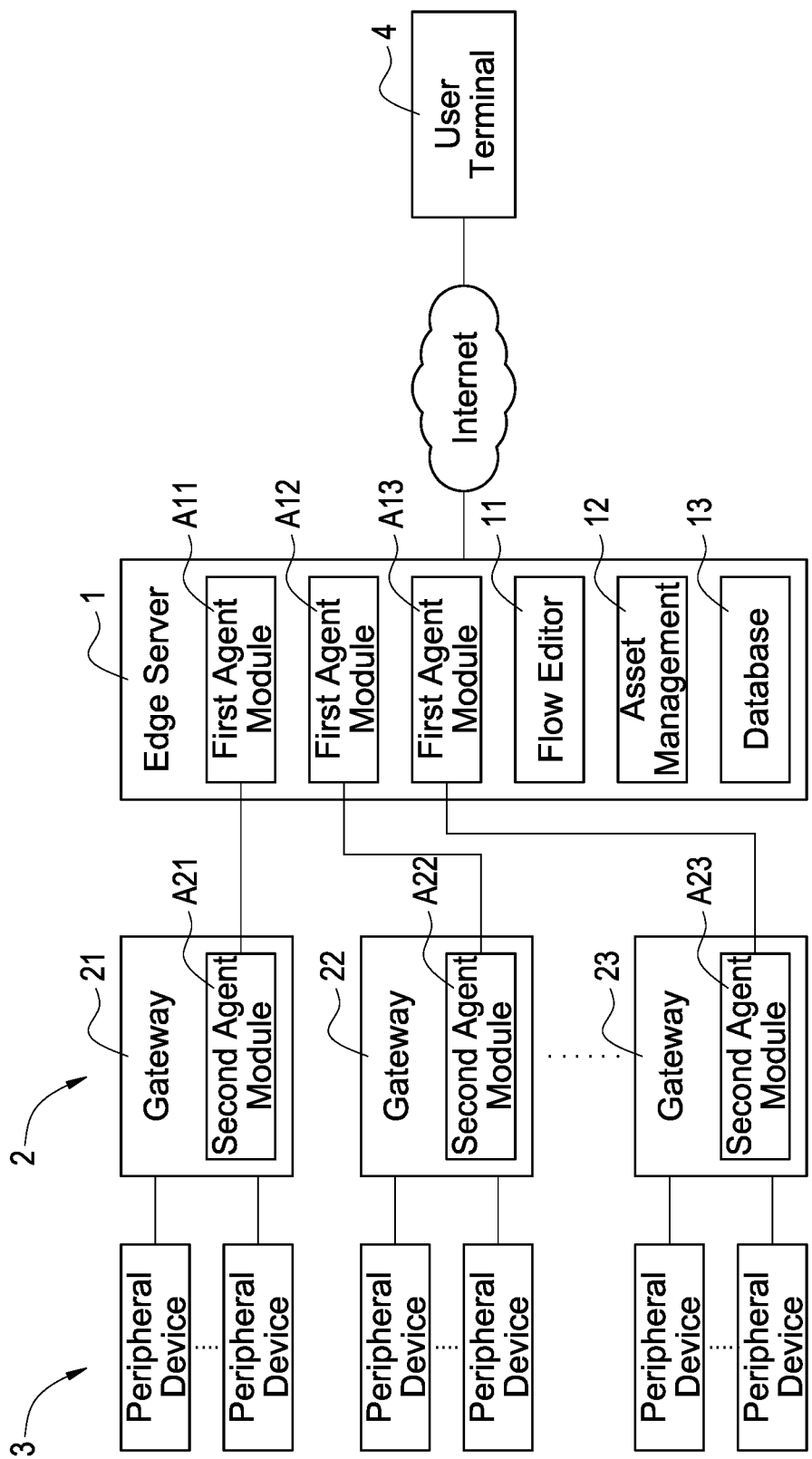
FIG. 1 is a block diagram of a deployment system of an embodiment according to the present disclosure.
Figure 2:
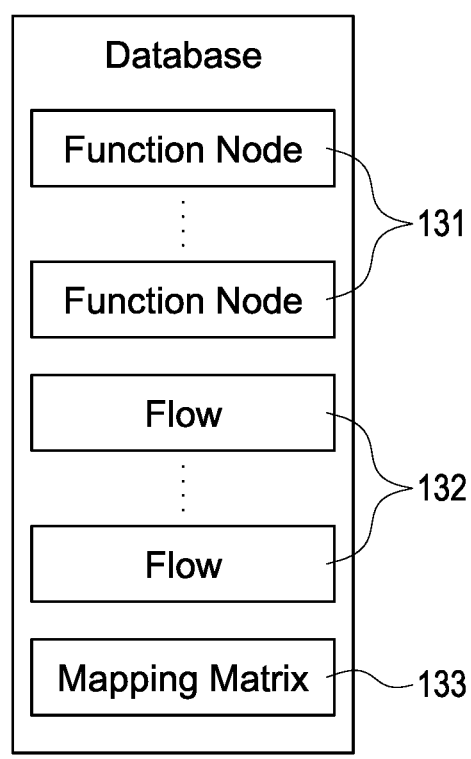
FIG. 2 is a schematic diagram of a database of an embodiment according to the present disclosure.

Please refer to FIG. 1 and FIG. 2, wherein FIG. 1 is a block diagram of a deployment system of an embodiment according to the present disclosure and FIG. 2 is a schematic diagram of a database of an embodiment according to the present disclosure. The present disclosure discloses a deployment system for Internet of Things (referred to as the deployment system hereinafter). As disclosed in FIG. 1, the deployment system at least includes an edge server 1 and multiple gateways 2, wherein the edge server 1 may communicate and connect with each of the gateways 2 through same or different communication protocols.

In the present disclosure, the edge server 1 is assigned with a maximum authority of the entire deployment system, so that the edge server 1 is responsible for the operation of all the gateways 2 in the environment. The edge server 1 includes a flow editor 11. The flow editor 11 may be manually used by a user or automatically used by the edge server 1 to edit one or more flows that are suitable for each of the gateways 2. Therefore, the edge server 1 may respectively perform a deploying procedure to each of the gateways 2 based on the one or more flows being edited, so that each gateway 2 may be used to implement a corresponding IoT function requested by the user (detailed described in the following).

As disclosed in FIG. 1, the edge server 1 includes multiple first agent modules A11-A13, a flow editor 11, an asset management 12, and a database 13. In a first embodiment, the edge server 1 uses a hardware architecture with a specific IoT tool program being executed therein, wherein the first agent modules A11-A13, the flow editor 11, the asset management 12, and the database 13 may be software modules that are generated by the edge server 1 after executing the corresponding software, but not limited thereto.

The multiple gateways 2 may be respectively connected with same or different peripheral devices 3 in the environment so as to support one or more function. For example, if one gateway 2 is connected with a peripheral device 3 that is a temperature sensor, the gateway 2 may be able to perform the event(s) related with temperature (i.e., the gateway 2 may support temperature data). For another example, if one gateway 2 is connected with a peripheral device 3 that is an electric light, the gateway 2 may execute the event(s) related with the electric light (i.e., the gateway 2 may support light data).

As disclosed in FIG. 1, each of the gateways 2 respectively includes one of the second agent modules A21-A23, wherein each of the second agent modules A21-A23 may be a software module that is generated by the software internally executed by each of the gateways 2, but not limited thereto.

In the present disclosure, the amount of the first agent modules A11-A13 in the edge server 1 is corresponding to the amount of the multiple gateways 2, and the edge server 1 respectively connects to each of the second agent modules A21-A23 of each gateway 2 through each of the first agent modules A11-A13.

In the embodiment of FIG. 1, three gateways 21-23 are arranged in the environment, and three first agent modules A11-A13 are configured in the edge server 1. Therefore, the edge server 1 may respectively connect with the three second agent modules A21, A22, and A23 of the three gateways 21, 22, and 23 through the three first agent modules A11, A12, and A13. In other words, the present disclosure uses a single edge server 1 to simultaneously operate all of the gateways 2, but the communication channels between the edge server 1 and each of the gateways 2 are separated. In sum, each of the gateways 2 does not have a controlling relationship with other gateways.

It should be mentioned that each of the gateways 2 of the present disclosure is only required to run a basic operating system (OS), and it is unnecessary for the gateways 2 to pre-install the function node(s) used to implement a desired IoT function.

To implement the IoT function in the related arts, it is necessary for every gateway to install a full version of an IoT tool program (i.e., all the gateways are required to record the scripts of all of the function nodes). On the contrary, the present disclosure installs the IoT tool program on the edge server 1, and the scripts and the parameters of the function nodes 131 required by the IoT function are stored in the database 13 of the edge server 1. The present disclosure may first ensure that one gateway 2 is suitable for a specific flow 132, then deploy this gateway 2 based on the specific flow 132, and then deploy the one or more function nodes 131 required by the specific flow 132 to this gateway 2 for being executed on this gateway 2. Therefore, the aforementioned problem that all the function nodes should be installed in all gateways may be prevented, and the waste of the hardware resources may be saved.

In one embodiment, the function nodes 131 are written by JavaScript. In the embodiment, each of the gateways 2 may run node.js software (not shown). Node.js is a runtime for each of the function nodes 131 that are written by JavaScript, the detailed technical content is omitted here. Each of the function node 131 is embedded with specific program codes, every time when a gateway 2 executes a function node 131, the program codes in the function node 131 may be executed to implement a corresponding function.

When performing the deploying procedure, the edge server 1 of the present disclosure may transmit a flow 132 being edited and the script of multiple function nodes 131 related to the flow 132 to a target gateway of the multiple gateways 2. According to the characteristic of event-driven and non-blocking I/O model of node.js, the target gateway 2 may sequentially execute each of the function nodes 131 according to the content of the flow 132, so as to implement the IoT function required by the flow 132 (detailed described in the following).

It should be mentioned that the present disclosure uses the edge server 1 to edit and manage the flow 132 of each of the gateways 2; however, the flow 132 of each of the gateways 2 is independent without interacting with other flows. Therefore, the present disclosure may achieve a technical effect that using a single edge server 1 to simultaneously manage all of the gateways 2. Also, the flows 132 being edited by the edge server 1 may be stored in the database 13.

In the present disclosure, the edge server 1 may respectively edit one or more flows 132 for each of the gateways 2 through the flow editor 11. In particular, the flow editor 11 may be automatically controlled by the edge server 1 or manually controlled by the user to select a target gateway from the multiple gateways 2 and select one or more function nodes 131 that are supportable by the target gateway. By establishing a connection among the selected function nodes 131, the flow editor 11 may generate a flow 132 that is suitable for the target gateway. In other words, the flow 132 is consisted by multiple function nodes 131 having a relationship with each other.

In the present disclosure, the edge server 1 or the user may use the flow editor 11 to respectively edit one or more flows 132 for each of the gateways 2. After one or more flows 132 are completely edited, the edge server 1 may respectively perform the deploying procedure to each of the gateways 2 through the flows 132. It should be mentioned that different gateways 2 may be connected to same or different peripheral devices 3 in order to support same or different function; therefore, the edge server 1 may either perform the deploying procedure to the multiple gateways 2 in accordance with same flow 132, or respectively perform the deploying procedure to different gateways 2 in accordance with different flows 132.

For example, the edge server 1 may edit a first flow in accordance with the hardware capability of a first gateway 2 and a desired function, and perform the deploying procedure to the first gateway 2 based on the first flow. Also, the edge server 1 may edit a second flow in accordance with the hardware capability of a second gateway 2 and a desired function and perform the deploying procedure to the second gateway 2 based on the second flow, and so on.

When performing the deploying procedure, the edge server 1 retrieves the script and the parameter of the multiple function nodes 131 included in the current flow 132 from the database 13, and then generates a corresponding packet based on the script and the parameter.

The corresponding packet may be an Internet packet that is supportable to the first agent modules A11-A13 and the second agent modules A21-A23. The corresponding packet includes the flow 132 as well as the script and the parameter of the multiple function nodes 131 included in the flow 132.

Next, the edge server 1 transmits the corresponding packet to the target gateway through one of the plurality of first agent modules A11-A13. The target gateway receives the corresponding packet through a second agent module configured in the target gateway. In the present disclosure, the first agent modules A11-A13 and the second agent modules A21-A23 are responsible for the communication between the edge server 1 and each of the gateways 2, and also responsible for analyzing, encrypting, and decrypting the transmission protocol of the packet transmitted between the edge server 1 and each of the gateways 2, but not limited thereto.

After receiving the corresponding packet, the target gateway analyzes the corresponding packet to obtain the script and the parameter of the multiple function nodes 131 and the flow 132 from the corresponding packet. Next, the target gateway may execute, in an order based on the content of the flow 132, the script of each of the function nodes 131 (for example, executes the script through node.js). Therefore, the target gateway may implement the IoT function required by the flow 132 through the function nodes 131 being sequentially executed. After all the function nodes 131 of the flow 132 are completely executed, an execution result is generated and the target gateway transmits the execution result to the edge server 1 through the second agent module.

The aforementioned function nodes 131 are different function nodes, such as a modbus node, a computation node, a transmission node, a receiving node, and an HTTP node, etc., required for implementing the desired IoT function. Each of the function nodes 131 is independent, and the flow editor 11 creates the relationships among the function nodes 131 by editing to form the flow 132.

For example, if a user edits a flow for a target gateway in order to implement a function of sending one e-mail a day at a constant time point, the content of the flow may include connecting a triggering node (used as a timer), an e-mail node (used to produce an e-mail), and a transmission node (used to send the e-mail being produced) in an order. After the flow being transmitted to the target gateway, the target gateway may sequentially execute, based on the content of the flow, the triggering node, the e-mail node, and the transmission node, so as to implement the function corresponding to the flow (i.e., to send one e-mail a day at a constant time point). Besides, the execution result of the flow may be transmitted back to the edge server 1 through the second agent module of the target gateway for further recording and processing.

As disclosed in FIG. 2, the database 13 includes a mapping matrix 133. The mapping matrix 133 is an internal structure of the edge server 1, and the mapping matrix 133 is used to record the relationship between each gateway 2 and the device data related to the flow 132 after the flow 132 is completely edited. In other words, the mapping matrix 133 is used to record the information that which gateway 2 include which type of device data.

In particular, after a flow 132 is completely edited, the edge server 1 may perform the deploying procedure to transmit the script and the parameter of all the function nodes 131 related to the flow 132 to the target gateway. After the deploying procedure, this information (i.e., which function node(s) 131 may be executed on the target gateway) may be recorded in the mapping matrix 133. If the user needs to check a specific type of device data (e.g., temperature data or boiler data, etc.), the user may inquire the mapping matrix 133 to find out which gateway(s) 2 to connect to obtain the desired type of device data (detailed described in the following).

As disclosed in FIG. 1, the edge server 1 includes an asset management 12, which is a central management component. In the present disclosure, the asset management 12 is used to record and manage assets of the edge server 1, such as the flows 132 being completely edited and the corresponding packets generated based on the flows 132, etc., but not limited thereto.

In order to join the deployment system, each gateway 2 needs to perform a registration to the edge server 1 after being activated and executing one of the second agent modules A21-A23 of the gateway 2. In particular, the gateway 2 may regard the gateway data (such as the IP address, the CPU information, and the memory information, etc.) of the gateway 2 and the device data of the peripheral device 3 being connected as registration data and transmit the registration data to the edge server 1. A gateway 2 after the registration may be regarded as an asset of the edge server 1; therefore, the asset management 12 may also record and manage the data related to the one or more gateways 2 that finish the registration.

As described above, the flow editor 11 may be manually used by the user or be automatically used by the edge server 1 to edit the flow 132 for each gateway 2. In one embodiment, the flow editor 11 may provide a browser-based flow editing page (such as the flow editing page 110 shown in FIG. 4). In the embodiment, the user may remotely control a user terminal 4, such as a personal computer, a laptop, a tablet, or a smart phone, etc., to login to the edge server 1 through the Internet. Therefore, the user may operate the user terminal 4 to open the flow editing page 110 and edit the flow 132 of each of the gateways 2 on the flow editing page 110.

Figure 3:
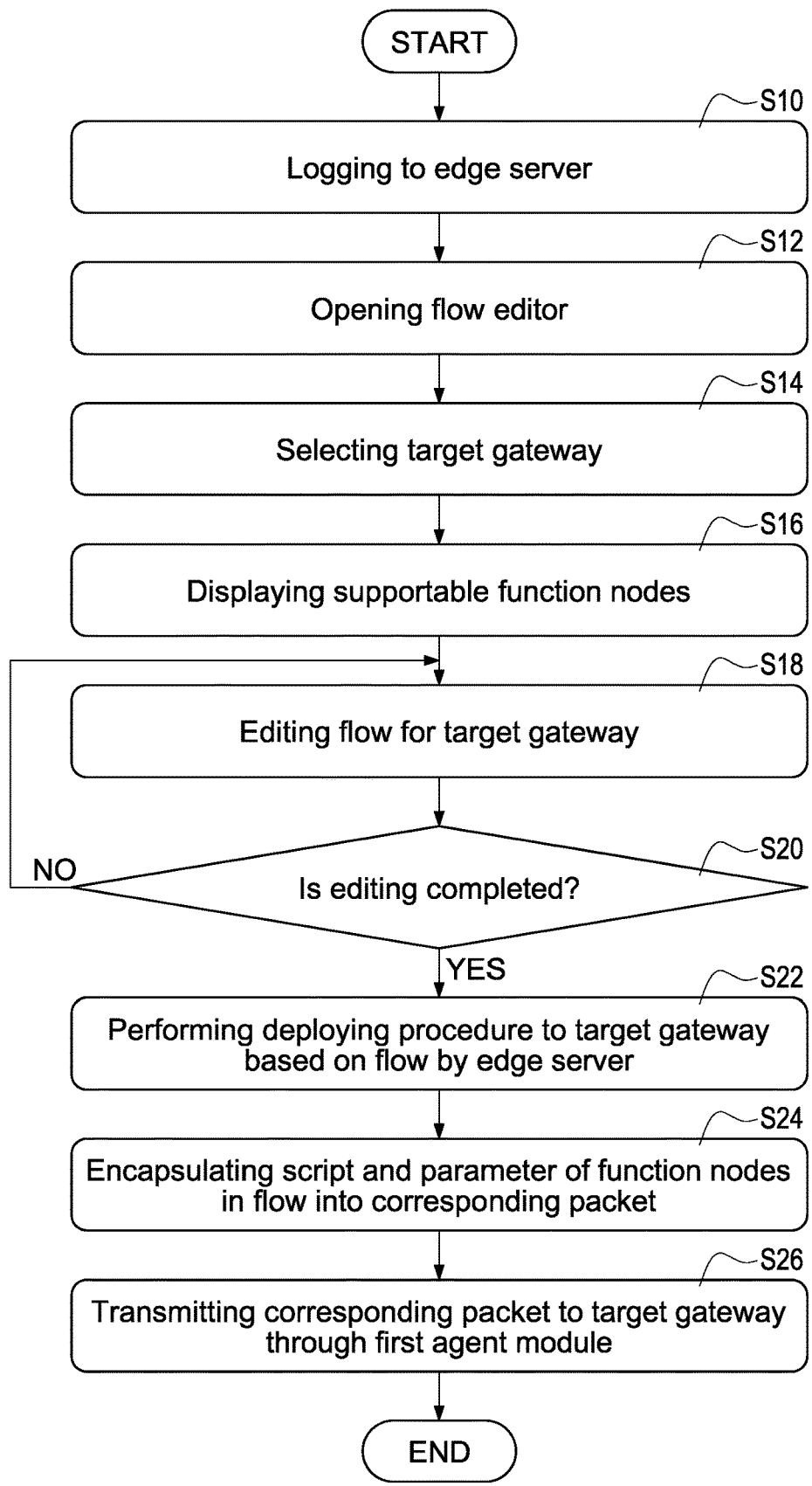
FIG. 3 is a first part of flowchart of a deployment method of an embodiment according to the present disclosure.

Please refer to FIG. 3, which is a first part of flowchart of a deployment method of an embodiment according to the present disclosure. As shown in FIG. 3, in order to deploy a gateway 2 through the edge server 1, the user needs to first use the user terminal 4 to login to the edge server 1 (step S10). More specific, the edge server 1 may provide a browser-based login page (not shown in the FIGs) for the user terminal 4 to login through the Internet. After being verified and logging successfully, the user may open the flow editor 11 of the edge server 1 (step S12).

Figure 4:
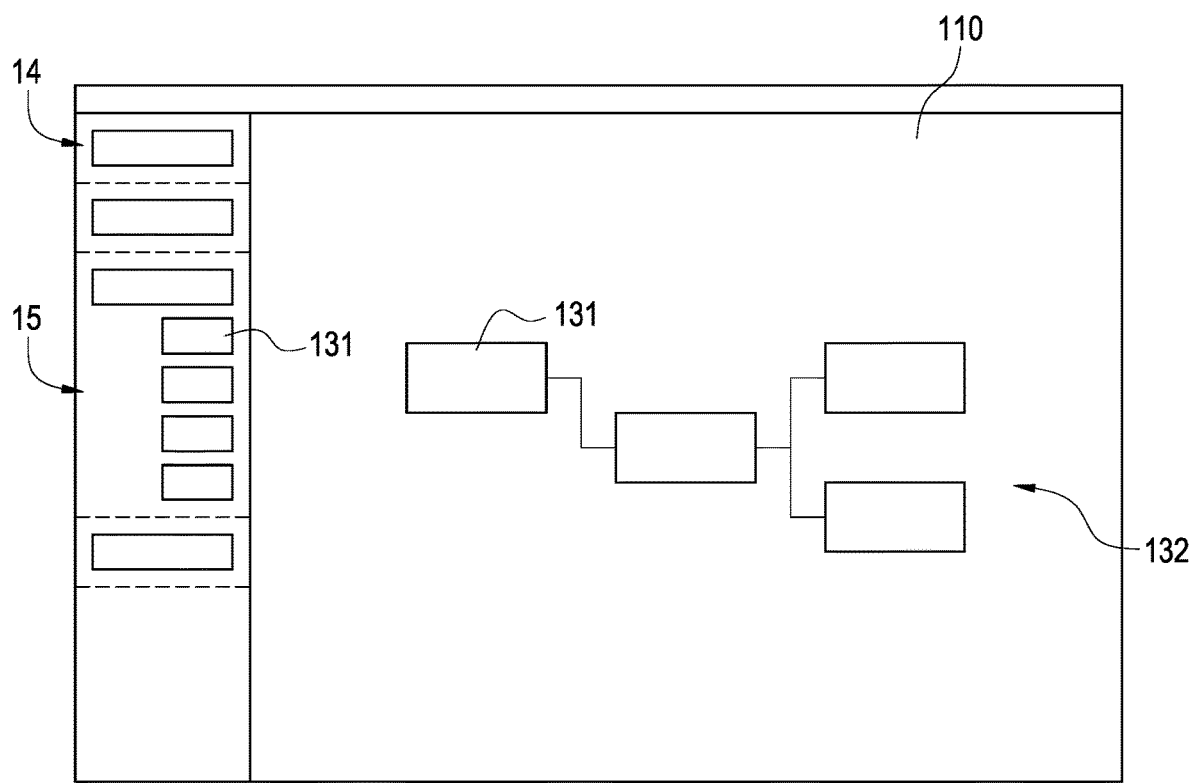
FIG. 4 is a schematic diagram for flow editing of an embodiment according to the present disclosure.

Please refer to FIG. 3 and FIG. 4 at the same time, wherein FIG. 4 is a schematic diagram for flow editing of an embodiment according to the present disclosure. As disclosed in FIG. 4, the flow editor 11 provides a browser-based flow editing page 110, and the flow editing page 110 provides a gateway list 14 and a node list 15. The gateway list 14 is used to display all gateways 2 that are successfully registered to the edge server 1 and the node list 15 is used to display one or more function nodes 131 that are supportable to each of the gateways 2.

After being opened, the flow editing page 110 may display all the successful-registered gateways 2 through the gateway list 14. Next, the user may select one of the multiple gateways 2 from the gateway list 14 as a target gateway (step S14). Next, the flow editing page 110 may display one or more function nodes 131 that are supportable to the selected target gateway on the node list 15 (step S16).

After the step S16, the user may edit a flow 132 for the target gateway based on the one or more function nodes 131 displayed on the node list 15 (step S18). In particular, the user in the step S18 may drag one or more required function nodes 131 from the node list 15 to the flow editing page 110, and then the user may create the relationship among these function nodes 131. Therefore, a complete flow 132 may be consisted by the multiple function nodes having relationship with each other.

In particular, one flow 132 may record multiple events, and each event respectively corresponds to one or more function nodes 131. When executing a flow 132, the target gateway may sequentially trigger the multiple events in the flow 132. Based on the characteristic of event-driven and non-blocking I/O model, the target gateway may sequentially execute the function node(s) 131 corresponding to each of the events. After all the events are finished executing (i.e., all the required function nodes 131 are executed), the target gateway may implement the IoT function required by the flow 132.

Please refer back to FIG. 3. When the user edits the flow 132, the edge server 1 continuously determines whether the editing is completed (step S20). For example, the edge server 1 may determine that the flow 132 is completely edited when the a store button or an export button (not shown) on the flow editing page 110 is triggered. After determining that the flow 132 is completely edited, the edge server 1 stores the flow 132 to the database 13.

It should be mentioned that, after a flow 132 is completely edited, the mapping matrix 133 may simultaneously store the relationship between the target gateway and the device data related to the flow 132.

After the step S20, the edge server 1 may perform the deploying procedure to the target gateway based on the flow 132 (step S22). During the deploying procedure, the edge server 1 first inquires the database 13 to obtain the script and the parameter of the multiple function nodes 131 included in the flow 132 and then generates a corresponding packet (step S24). Also, the edge server 1 transmits the corresponding packet to the target gateway through a corresponding one of the multiple first agent modules A11-A13. Therefore, the target gateway may receive the corresponding packet and then sequentially execute the multiple function nodes 131 based on the content of the flow 132, so as to complete the deployment to implement the desired IoT function correspondingly (step S26).

It should be mentioned that, after the multiple gateways 2 are finished registration, the edge server 1 may record and manage data of the multiple gateways 2 through the asset management 12. After the step S18, the edge server 1 may record and manage the flow 132 being completely edited through the asset management 12. After the step S24, the edge server 1 may record and manage the corresponding packet generated in accordance with the flow 132 through the asset management 12.

The present disclosure edits the flow 132 of all gateways 2 through the edge server 1. In other words, Due to the data and the flow editor 11 provided by the edge server 1, the user may respectively decide a desired IoT function for each of the gateways 2 in accordance with both the hardware capability of each gateway 2 and the peripheral device(s) 3 connected with each gateway 2.

For example, when editing the flow 132 for a first gateway, the user may configure the flow 132 to include a specific function node 131, wherein the action of executing the specific function node 131 is regarded as an event. Therefore, When performing the deploying procedure to the first gateway, the edge server 1 needs to transmit the script and the parameter of the specific function node 131 to the first gateway. When the first gateway triggers the event based on the content of the flow 132, the first gateway executes the specific function node 131 to implement the IoT function correspondingly.

Figure 5:
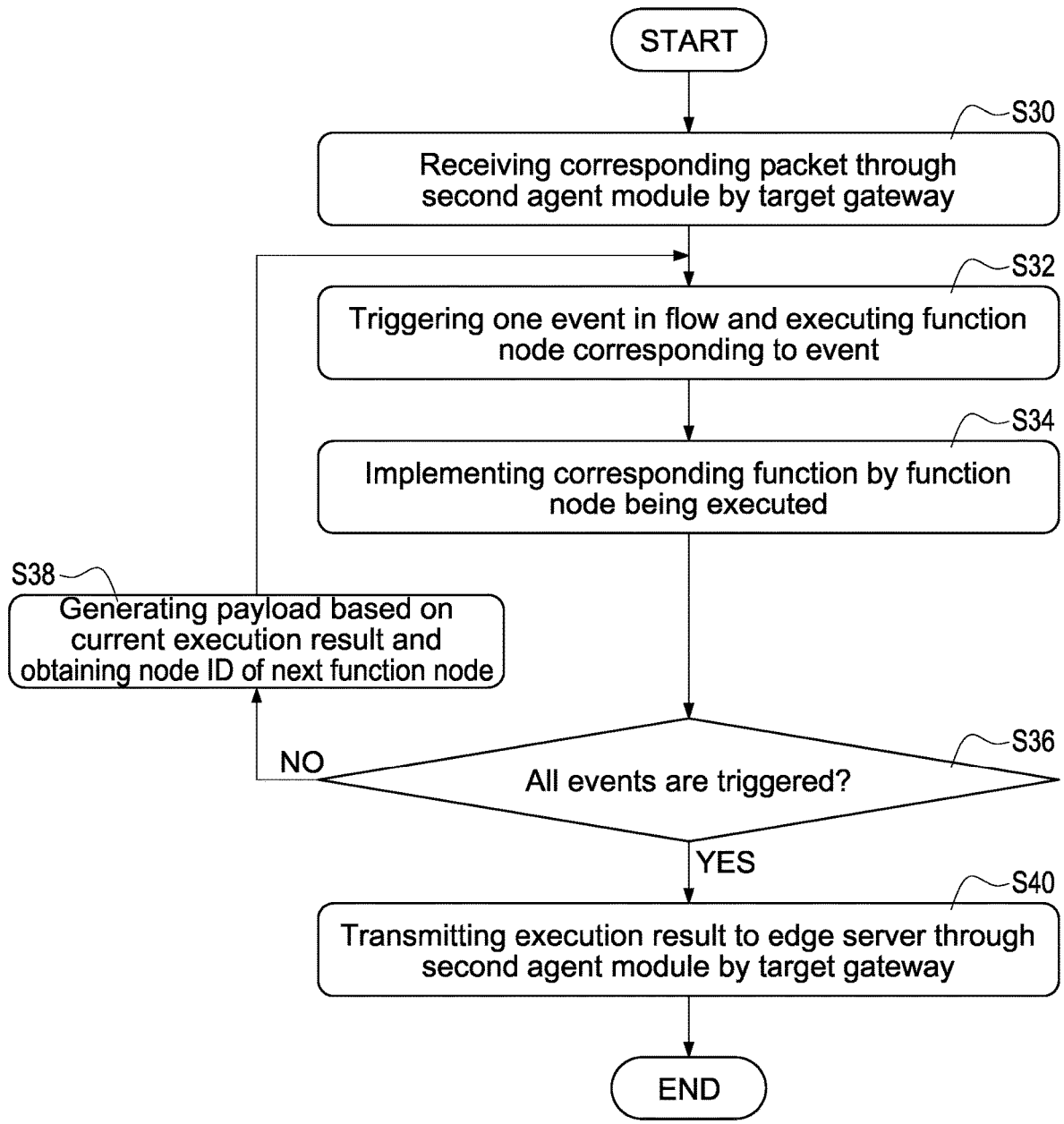
FIG. 5 is a second part of flowchart of the deployment method of the embodiment according to the present disclosure.

Please refer to FIG. 3 and FIG. 5 at the same time, wherein FIG. 5 is a second part of flowchart of the deployment method of the embodiment according to the present disclosure.

FIG. 5 is provided to further interpret the step S26 as shown in FIG. 3.

As disclosed in FIG. 5, after the edge server 1 performs the deploying procedure and transmits the corresponding packet to the target gateway, the target gateway may receive the corresponding packet through the second agent module configured in the target gateway (step S30). The target gateway may analyze the corresponding packet by the second agent module to obtain the flow 132 in the corresponding packet, and also obtain the script and the parameter of the multiple function nodes 131 included in the flow 132.

Next, the target gateway triggers one event in the flow 132 and executes the function node 131 corresponding to the event (step S32), and then a corresponding function may be implemented by the executed function node 131 (step S34).

After the step S34, the target gateway determines whether all the events in the flow 132 are triggered (step S36). If the determination of the step S36 is negative, the target gateway may generate a payload based on the current execution result, and then obtain the node ID of a next function node 131 corresponding to a next event (step S38). Next, the target gateway re-executes the step S32 and the step S34 based on the payload and the node ID to execute the function node 131 that is corresponding to the next event in order to implement the corresponding function.

If the determination of the step S36 is positive, it means that the target gateway is successfully deployed, so the target gateway may implement the an IoT function indicated by the flow 132 through the multiple function nodes 131 being executed. Under such circumstance, the target gateway may generate and transmit an execution result to the edge server 1 through the second agent module (step S40), so that the edge server 1 may perform further recording and processing in accordance with the execution result.

In one embodiment, the edge server 1 only provides the flow editing page 110 through the flow editor 11. In other words, the user may only check and edit the flow 132 of each gateway 2 on the flow editing page 110 after logging to the edge server 1, but the user may not check the gateway data and the device data of the peripheral device(s) 3 connected to each of the gateways 2 on the flow editing page 110.

Figure 6:
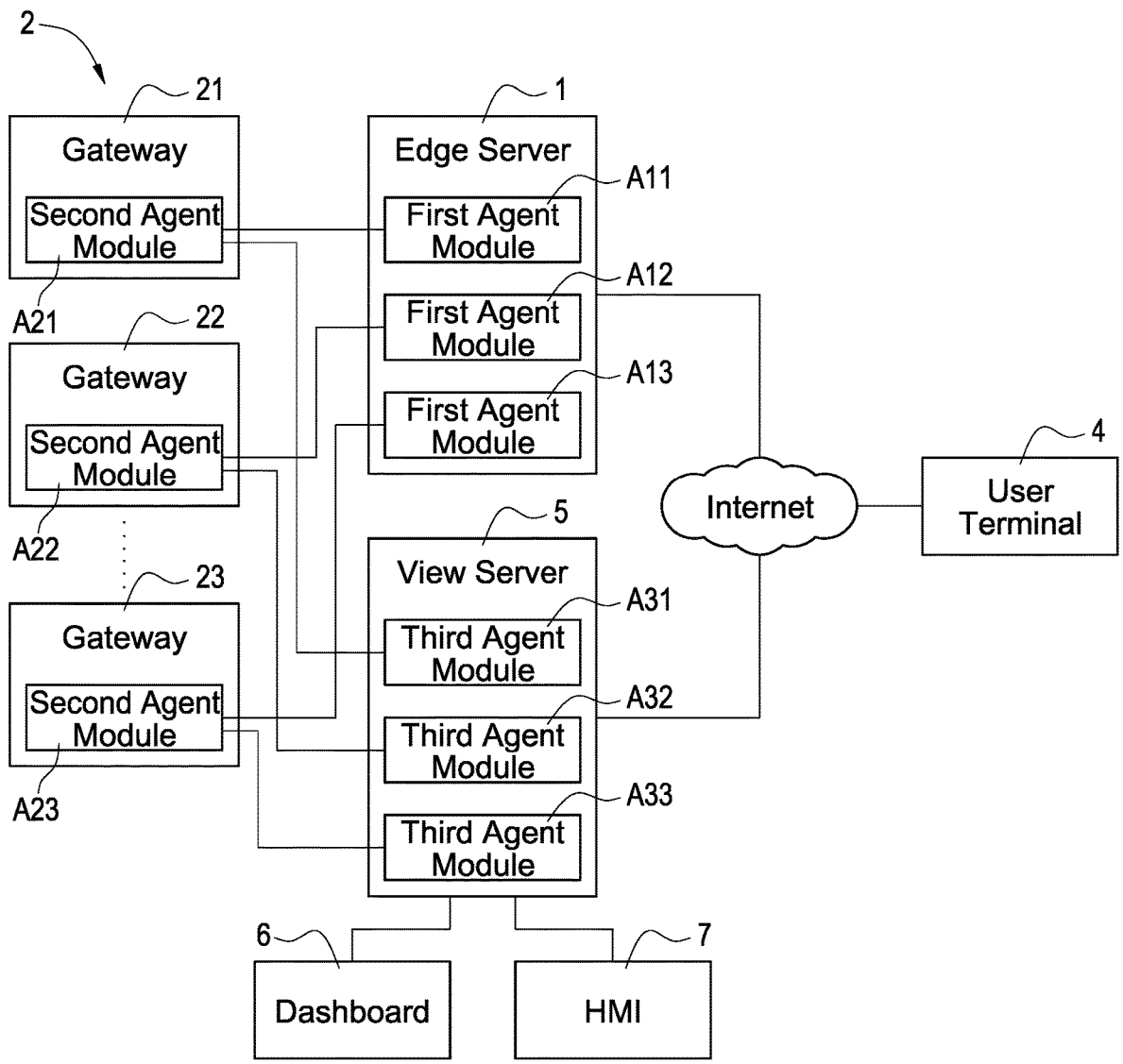
FIG. 6 is a block diagram of a deployment system of an embodiment according to the present disclosure.

Please refer to FIG. 1, FIG. 3, and FIG. 6 at the same time, wherein FIG. 6 is a block diagram of a deployment system of an embodiment according to the present disclosure. In the embodiment of FIG. 6, the deployment system further includes a view server 5 that is individually arranged out of the edge server 1. In the embodiment, the view server 5 is arranged to provide the user terminal 4 to login to check the gateway data of the multiple gateways 2 of the deployment system, and the device data of the peripheral device(s) 3 connected to each of the gateways 2.

As shown in FIG. 6, the view server 5 may include multiple third agent modules A31-A33, wherein the third agent modules A31-A33 may be software modules generated after the view server 5 executes a specific software, but not limited thereto.

In the present disclosure, the amount of the third agent modules A31-A33 in the view server 5 may be corresponding to the amount of the multiple gateways 2, and the view server 5 may respectively connect to each of the second agent modules A21-A23 of each gateway 2 through each of the third agent modules A31-A33. For example, if three gateways 21-23 are arranged in the environment, the view server 5 may be configured with three of the third agent modules A31-A33 to respectively connect to the three gateways 21, 22, and 23. Therefore, the view server 5 may respectively send an inquiring request for data to each of the gateways 2 through the third agent modules A31-A33, respectively receive the data responded from each of the gateways 2 through the third agent modules A31-A33, and then display the received data on the view server 5.

It should be mentioned that, the view server 5 is similar to the edge server 1 in that the communication channels between the view server 5 and each of the gateways 2 are divided and independent, and it is unnecessary for each of the gateways 2 to share its data with other gateways 2.

In the embodiment, the view server 5 may provide a browser-based dashboard 6 and a browser-based human-machine interface (HMI) 7, wherein the dashboard 6 is configured to display the gateway data and the device data, and the HMI 7 is configured to control the gateways 2 and/or the peripheral devices 3.

In particular, the user at a remote end may operate the user terminal 4 to login to the view server 5, then select a required device data, and then set a desired displaying approach on the dashboard 6. For example, the user may select sensor data and set Line Chart, Histogram, Bar Chart, or Pie Chart on the dashboard 6 to display the sensor data.

After the setting to the dashboard 6 is finished, the view server 5 may know the user about using which approach to display what data (i.e., which type of device data). In the embodiment, the view server 5 may connect to the edge server 1 to inquire the mapping matrix 133 from the database 13 of the edge server 1. By inquiring the content of the mapping matrix 133, the view server 5 may confirm what device data may be supportable to each of the gateways 2.

For example, if the user selects the temperature data on the dashboard 6 and the mapping matrix 133 indicates that the peripheral device 3 connected to a first gateway and a third gateway is a temperature sensor, then the view server 5 may confirm that the first gateway and the third gateway are supportable to the temperature data selected by the user. In other words, if the view server 5 wants to display the temperature data selected by the user on the dashboard 6, the view server 5 needs to send a data collecting request to the first gateway and/or the third gateway that are supportable to temperature data.

After confirming the device data that is supportable to each of the gateways 2 through inquiring the mapping matrix 133, the view server 5 may then send, based on an external operation made by the user, the data collecting request aimed at a designated device data (such as the aforementioned temperature data) to one or more gateways (such as the first gateway and the third gateway exampled above) that are supportable to the designated device data. In particular, the view server 5 sends the data collecting request to the supportable gateway(s) through corresponding third agent module(s) A31-A33.

After receiving the data collecting request, the supportable gateway may encapsulate the designated device data (such as the temperature data) into a corresponding packet and transmit the corresponding packet to the view server 5 through the second agent module in the supportable gateway. After receiving the designated device data transmitted from each of the gateway 2, the view server 5 may display the designated device data on the dashboard 6 in according to an approach (such as Line Chart) designated by the user.

In the related art, when the user wants to check the designated device data, the user must respectively set the IP address of each gateway on the user terminal, so that the user terminal is allowed to sequentially connect to each gateway to obtain the designated device data. In the present disclosure, the user only needs to set the IP address of the view server 5 on the user terminal 4, and the view server 5 may automatically connect to each of the multiple gateways 2 to simultaneously obtain all the designated device data, which is very convenient.

As discussed above, the view server 5 further provides a browser-based HMI 7, and the view server 5 may confirm which gateway 2 may be supportable to which device data by inquiring the mapping matrix 133. The user may operate the user terminal 4 to open and control the HMI 7 on the view sever 5; therefore, the HMI 7 may send a control command to one or more supportable gateways based on an approach designated by the user, so as to control the gateways 2 or the peripheral devices 3 connected with the gateways 2 (for example, to switch the power of a sensor).

As mentioned above, the deployment system of the present disclosure uses the edge server 1 to manage and edit the flow 132 of each gateway 2 in order to perform the deploying procedure to each gateway 2, and uses the view server 5 to ask each gateway 2 for the required device data in order to display the device data on the view server 5. To implement the above function, each gateway 2 of the present disclosure must perform registration respectively to both of the edge server 1 and the view server 5.

Figure 7:
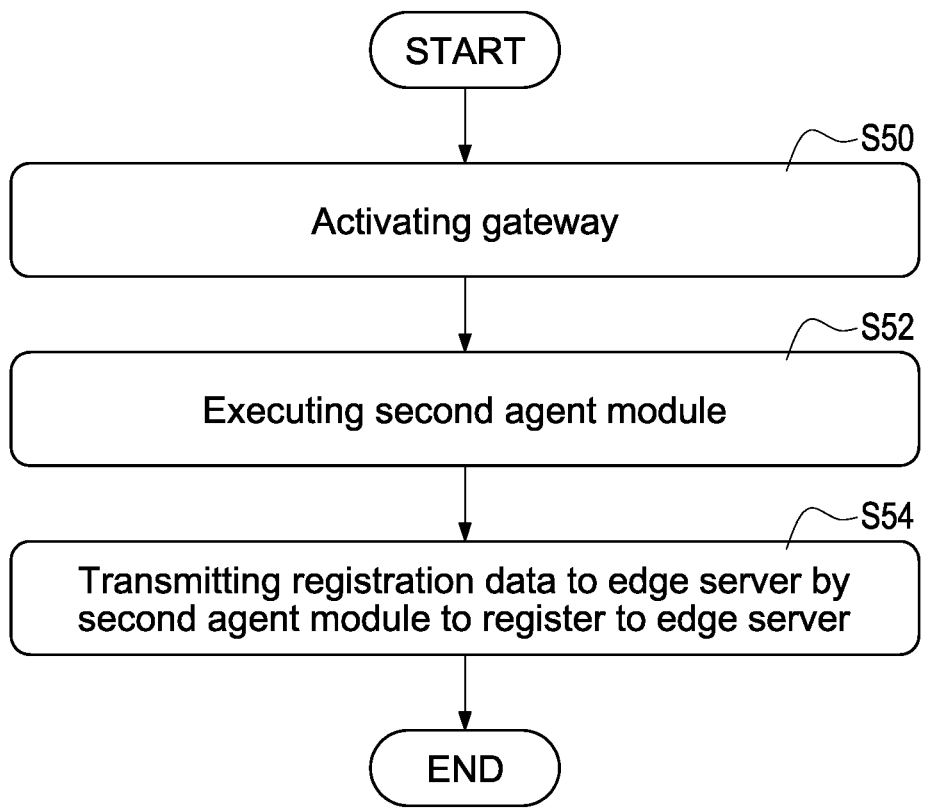
FIG. 7 is a registering flowchart of an embodiment according to the present disclosure.

Please refer to FIG. 7, which is a registering flowchart of an embodiment according to the present disclosure. When constructing the deployment system of the present disclosure, the user needs to first activate at least one gateway 2 in the environment (step S50), and then the gateway 2 executes an internal second agent module A21, A22, or A23 after being activated (step S52). In the embodiment, the first agent modules A11-A13, the second agent modules A21-A23, and the third agent modules A31-A33 are created and provided by same manufacturer. After the gateway 2 executes the second agent module A21, A22, or A23, the second agent module A21, A22, or A23 may automatically search for and connect to the edge server 1 and the view server 5.

After the second agent module A21, A22, or A23 is executed, it may automatically transmit the registration data to the edge server 1 (and the view server 5) to register to the edge server 1 (and the view server 5) (step S54), wherein the registration data includes the gateway data of the gateway 2 and the device data of the peripheral device 3 connected with the gateway 2. In one embodiment, the gateway data may be, for example but not limited to, the IP address, the CPU information, and the memory information of the gateway. In one embodiment, the device data may be, for example but not limited to, the Port IO and the communication protocol (such as Modbus or OPCUA) of the peripheral device 3, etc.

In particular, when performing registration, the gateway 2 regards the gateway data and the device data as the registration data and uses the second agent module A21, A22, or A23 to transmit the registration data to the edge server 1 and the view server 5 to complete the entire registration procedure. As a result, after one gateway 2 is finished registration, the edge server 1 and the view server 5 know the existence of the gateway 2, and the edge server 1 and the view server 5 also know which of the function nodes 121 are supportable to the gateway 2 and what type of device data is supportable to the gateway 2.

By using the deployment system of the present disclosure, the user may only deploy the essential function node(s) to each gateway based on the flow being completely edited without pre-installing all the nodes required by the IoT onto all of the gateways. Therefore, the waste of the hardware resources may be prevented.

Besides, the deployment system of the present disclosure centralizes the deploying authority to the edge server. When a large number of gateways in the environment needs to be updated, the user only needs to edit the flow of each gateway on the edge server to re-deploy all the gateways. In sum, the deploying time costs may be prevented from wasting.

As the skilled person will appreciate, various changes and modifications can be made to the described embodiment. It is intended to include all such variations, modifications and equivalents which fall within the scope of the present invention, as defined in the accompanying claims.

What is claimed is:

1. A deployment system for Internet of Things, comprising:
    an edge server, having a database and a plurality of first agent modules, wherein the database records a script and a parameter of multiple function nodes;
    multiple gateways, respectively connecting with different peripheral devices to support different function, each of the multiple gateways being configured with a second agent module, wherein the edge server respectively connects to the second agent module of each gateway through the plurality of first agent modules; and
    a flow editor, arranged on the edge server, used to edit a flow of a target gateway of the multiple gateways, wherein the flow is consisted by multiple function nodes having a relationship with each other;
    wherein, the edge server is configured to perform a deploying procedure to the target gateway, the deploying procedure obtains the script and the parameter of the multiple function nodes included in the flow from the database to generate a corresponding packet and transmit the corresponding packet to the target gateway through one of the plurality of first agent module, and the target gateway sequentially executes the script of each of the function nodes based on the flow to generate an execution result and transmits the execution result to the edge server through the second agent module.

2. The deployment system in claim 1, wherein each of the gateways respectively runs an operating system (OS) and a node.js software, wherein the multiple function nodes are written by JavaScript and the node.js software is a runtime of the multiple function nodes.

3. The deployment system in claim 1, wherein each of the gateways performs registration to the edge server after executing the second agent module and regards gateway data and device data of the peripheral device being connected as a registration data to transmit to the edge server.

4. The deployment system in claim 3, wherein the edge server comprises an asset management, and the asset management records and manages the gateway data of the multiple gateways that are finished registration, the flow being edited, and the corresponding packet generated based on the flow.

5. The deployment system in claim 3, wherein the flow editor provides a browser-based flow editing page, the flow editing page provides a gateway list and a node list, the gateway list is configured to display the multiple gateways that are finished registration, and the node list is configured to display one or more of the function nodes that are supportable to each of the gateways, wherein the flow editing page is configured to receive an external operation to select the target gateway from the gateway list and edit the flow based on the one or more function nodes displayed on the node list with respect to the target gateway.

6. The deployment system in claim 5, wherein the database records a mapping matrix, and the mapping matrix is configured to record a relationship between the target gateway and the device data related to the flow after the flow is completely edited.

7. The deployment system in claim 6, further comprising a view server, comprising a plurality of third agent modules, and respectively connecting to the second agent module of each of the gateways through the plurality of third agent modules to respectively receive the device data responded from each of the gateways and display the received device data.

8. The deployment system in claim 7, wherein the view server is configured to connect to the edge server to inquire the mapping matrix to confirm the device data that is supportable to each of the gateways, and send a data collecting request to one or more gateways that are supportable to a designated device data.

9. The deployment system in claim 8, wherein the view server is configured to provide a browser-based dashboard and a browser-based human-machine interface (HMI), the dashboard is configured to display the designated device data based on a first designated approach, and the HMI is configured to send a control command to the one or more gateways that are supportable to the designated device data based on a second approach.

10. A deployment method for Internet of Things, incorporated with a deployment system comprising an edge server and multiple gateways, comprising:
- logging to the edge server, wherein the edge server comprises a database and a plurality of first agent modules, and the database records a script and a parameter of multiple function nodes;
- opening a flow editor on the edge server;
- selecting a target gateway from the multiple gateways on the flow editor, wherein each of the multiple gateways respectively connects to different peripheral devices to support different function, and each of the multiple gateways respectively comprises a second agent module;
- editing a flow of the target gateway, wherein the flow is consisted by multiple function nodes having relationship with each other;
- performing a deploying procedure to the target gateway based on the flow by the edge server, and the deploying procedure comprises:
  - reading the database to obtain the script and the parameter of the multiple function nodes in the flow to generate a corresponding packet; and
  - transmitting the corresponding packet to the target gateway through one of the first agent modules;
- sequentially executing the script of each of the function nodes based on the flow by the target gateway and generating an execution result; and
- transmitting the execution result to the edge server by the second agent module of the target gateway.

11. The deployment method in claim 10, further comprising:
- activating one of the multiple gateways;
- executing the second agent module by the gateway being activated; and
- regarding gateway data of the gateway and device data of the peripheral device connected to the gateway as a registration data and transmitting the registration data to the edge server by the second agent module to perform registration to the edge server.

12. The deployment method in claim 11, wherein the step of sequentially executing the script of each of the function nodes based on the flow by the target gateway and generating the execution result comprises:
- receiving the corresponding packet by the target gateway;
- triggering an event of the flow and executing one of the function nodes corresponding to the event;
- implementing a function correspondingly by the function node being executed;
- determining whether all the events of the flow are triggered; and
- generating a payload based on the current execution result and obtaining a node ID of one of the function nodes corresponding to a next event before all the events of the flow are triggered, and re-executing the step of triggering the event of the flow and executing one of the function nodes corresponding to the event and the step of implementing the function correspondingly by the function node being executed in accordance with the payload and the node ID.

13. The deployment method in claim 11, wherein the edge server comprises an asset management, the asset management is configured to record and manage gateway data of the multiple gateways that are finished registration, the flow being completely edited, and the corresponding packet generated based on the flow.

14. The deployment method in claim 13, wherein the flow editor is configured to provide a browser-based flow editing page, and the flow editing page is configured to provide a gateway list and a node list;
- wherein, the step of selecting the target gateway from the multiple gateways on the flow editor comprises displaying the multiple gateways that are finished registration through the gateway list and selecting the target gateway from the gateway list by the flow editing page;
- wherein, the step of editing a flow of the target gateway comprises displaying one or more function nodes that are supportable to the target gateway on the node list and editing the flow based on the one or more function nodes displayed on the node list by the flow editing page.

15. The deployment method in claim 4, wherein the database is configured to record a mapping matrix, and the deployment method further comprises recording a relationship between the target gateway and the device data related to the flow in the mapping matrix after the step of editing the flow of the target gateway.

16. The deployment method in claim 15, wherein the deployment system comprises a view server having multiple third agent modules, and the view server respectively connects to the second agent module of each of the gateways through the multiple third agent modules to respectively receive the device data responded from each of the gateways and display the received device data.

17. The deployment method in claim 16, further comprising:
- connecting to the edge server to read the mapping matrix by the view server;
- confirming the device data supportable to each of the gateways through the mapping matrix by the view server; and
- sending a data collecting request to one or more gateways that are supportable to a designated device data by the view server.

18. The deployment method in claim 17, wherein the view server is configured to provide a browser-based dashboard and a browser-based human-machine interface (HMI), the dashboard is configured to display the designated device data based on a first designated approach, and the HMI is configured to send a control command to the one or more gateways that are supportable to the designated device data based on a second designated approach.

* * * * *